April 30, 1957  E. J. CRANKSHAW  2,790,519
FLUID BRAKE

Filed July 1, 1955  3 Sheets-Sheet 1

INVENTOR.
Edwin J. Crankshaw.
BY
Fishburn & Mallender
ATTORNEYS.

April 30, 1957 E. J. CRANKSHAW 2,790,519
FLUID BRAKE
Filed July 1, 1955 3 Sheets-Sheet 2

INVENTOR.
Edwin J. Crankshaw
BY Fishburn + Mullendore
ATTORNEYS.

April 30, 1957  E. J. CRANKSHAW  2,790,519
FLUID BRAKE
Filed July 1, 1955  3 Sheets-Sheet 3

INVENTOR.
Edwin J. Crankshaw.
BY
Fishburn + Mullendore
ATTORNEYS.

United States Patent Office 2,790,519
Patented Apr. 30, 1957

2,790,519

FLUID BRAKE

Edwin J. Crankshaw, Ellinwood, Kans.

Application July 1, 1955, Serial No. 519,395

5 Claims. (Cl. 188—90)

This invention relates to fluid brakes, and more particularly to a novel brake or retarder and controls therefor adapted to be used on vehicles in addition to the usual wheel brakes to retard the speed or provide braking action down long grades and in other instances of necessary slowing of vehicles to reduce strain and wear on the usual wheel brakes.

The objects of the present invention are to provide an improved brake structure which include, a stator mounted on a vehicle and enclosing a rotor connected to the vehicle drive shaft, and liquid flow controls for regulating retarding force applied to the rotor; to provide such a brake with a vane type rotor and fluid actuated members operative for selectively retaining vanes in retracted position; to provide a fluid pressure supply actuated by the shaft connected to the rotor and automatically controlled fluid flow for suitable vehicle retardation of forward or reverse movement; to provide such a brake with pressure responsive by-passes for limiting braking force applied to the rotor; to provide rotor vane controllers for holding the vanes in position for minimum fluid friction when the braking apparatus is not used for retarding speed, and to provide a compact, durable, efficient fluid brake structure that is economical to install and is positive in operation.

In accomplishing these and other objects of the present invention, I have provided improved details of structure, the preferred forms of which are illustrated in the accompanying drawings, wherein.

Figure 1:
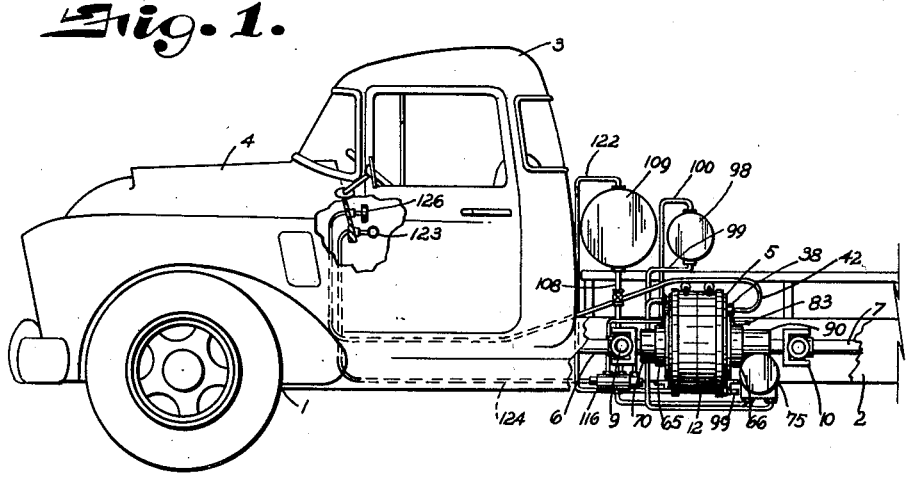
Fig. 1 is a side elevation of a portion of a vehicle with parts broken away to show the application of a fluid brake embodying the features of the present invention.

Referring more in detail to the drawings:

1 designates a vehicle having a wheel supported frame 2 and carrying a cab 3 and hood 4 enclosing the usual engine (not shown). The brake mechanism 5 is suitably suspended from the frame 2 between the cab 3 and the rear drive wheels (not shown). A drive shaft 6 connects the engine through the usual change speed transmission to the front end of the brake 5 and a drive shaft 7 connects the rear end of the brake to the rear drive wheels through the usual differential and drive axle mechanism (not shown).

The brake 5 includes a rotor shaft 8 having its ends connected to the drive shafts 6 and 7 by suitable universal joint connections 9 and 10 respectively. A rotor 11 is fixed to the shaft 8 and is enclosed in a casing 12. The casing 12 includes end walls 13 and 14 and substantially cylindrical spaced concentric inner and outer walls 15 and 16 to define a space 17 therebetween for containing cooling liquid as later described. For convenience of manufacturer, it is preferable that the casing be split intermediate the length thereof as at 18 and the adjacent faces of the inner and outer wall portions be provided with registering grooves 20 and O-rings 21 or other suitable seal members arranged therein and the two portions of the split casing drawn together by suitable fastening devices such as bolts 22 having shanks 23 extending through apertures 24 of thickened portions 25 of the inner wall 15, the apertures 24 being spaced outwardly relative to the groove 20 and seal ring 21 therein.

A cylindrical rotor housing 26 is arranged inside of the casing eccentrically of the inner wall 15. The rotor housing 26 is preferably of a metal having long-wearing characteristics and has a polished bore 27. The ends of the cylindrical housing 26 extends into grooves 28 in each of the end walls 13 and 14, and portions 29 and 30 are integral with and extend inwardly from the inner wall 15 to engage the rotor housing to provide diametrically opposite supporting engagement for said rotor housing. The portion 29 is at the side of the rotor housing having the greatest spacing from the inner wall 15 and tightly engages said rotor housing to provide a separating member cooperating with the inner wall 15 and rotor housing 26 to define fluid chambers 31 and 32 on opposite sides of the portion 29 which communicate through elongated slots or other suitable ports 33 and 34 respectively in the rotor housing to the bore 27 of said housing. The portion 29 has a longitudinal bore 35 extending therethrough substantially parallel to the axis of the bore in the rotor housing 26, and a valve member 36 is rotatably mounted in said bore 35. The end of the bore 35 opening through the end wall 13 is suitably closed by a plug 37, the inner end of which engages the valve member 36. The other end of the bore has a plug 38 sealingly secured therein with a seal member 39 engaging a valve operating disc 40 fastened by a key 41 to the valve member 36 and connected to a shaft 42 that extends through a bore 43 in the plug.

Figure 3:
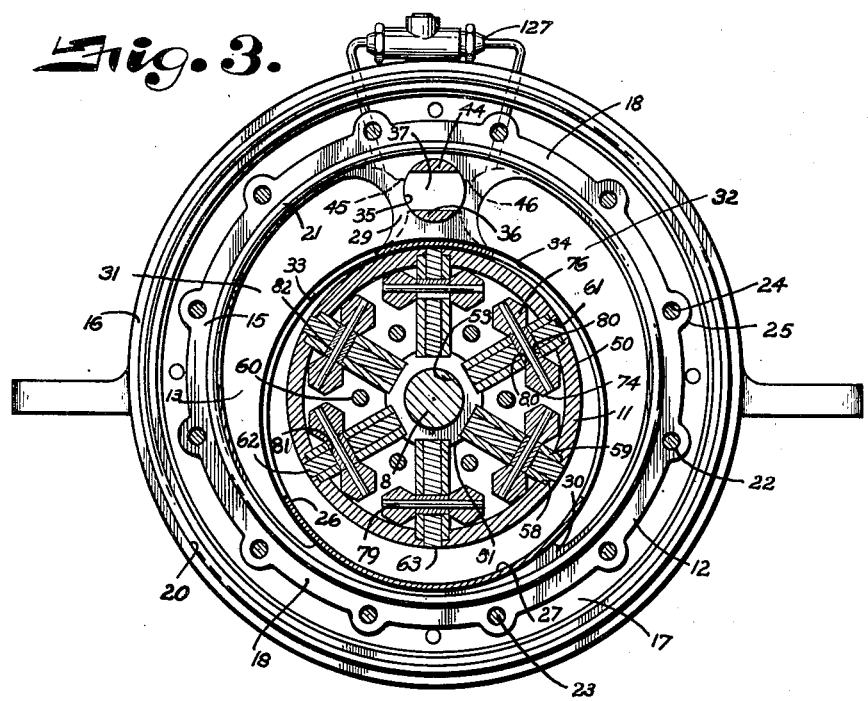
Fig. 3 is a transverse sectional view through the brake stator and rotor illustrating the rotor vanes in retracted position.
Figure 4:
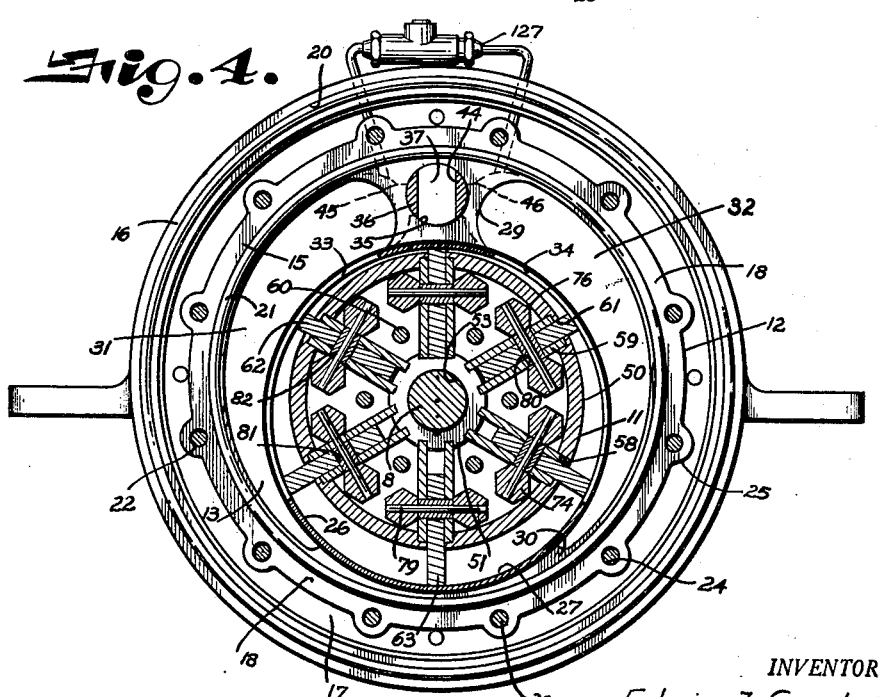
Fig. 4 is a similar transverse sectional view through the stator and rotor taken on the lines 4—4, Fig. 2, with the vanes and flow valve in speed-retarding position.
Figure 5:
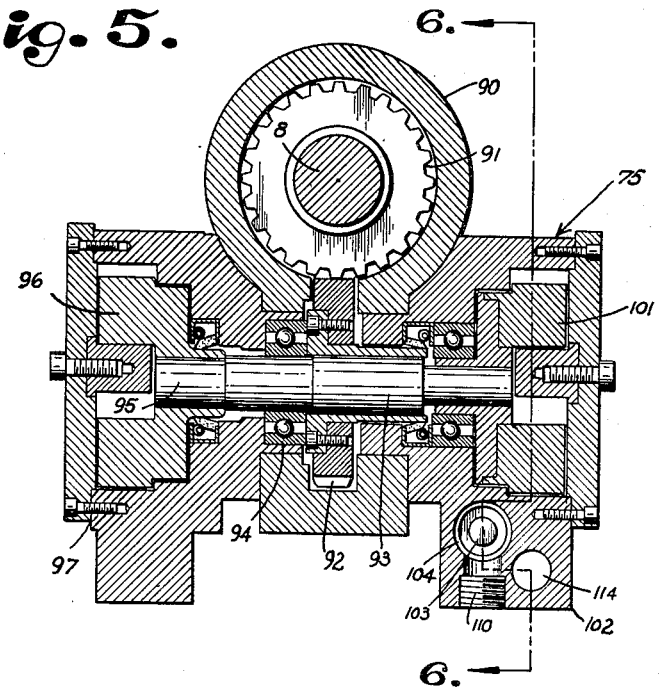
Fig. 5 is a transverse sectional view through fluid pressure supply pump and drive therefor taken on the line 5—5, Fig. 2.

The valve 36 has flow passages 44 extending transversely therethrough intermediate its ends, and of suitable size whereby when rotated by the shaft 42 to a position as shown in Fig. 3 the passage is in communication with ports 45 and 46 providing for flow between the fluid chambers 31 and 32, and when the shaft 42 is rotated 90°, the passages 44 are arranged as illustrated in Fig. 4 whereby the walls of the valve member 36 prevent any fluid flow between the fluid chambers 31 and 32.

The end walls 13 and 14 have aligned bores 47 arranged eccentrically relative to the rotor housing 26 and bearing members 48 are suitably mounted in said bores and adapted to support the rotor 11 in the rotor housing.

The rotor 11 preferably includes a ring member 50 and end members 51, said end members having hubs 52 on which the bearings 48 are sleeved to rotatably mount the rotor in said bearings. The hubs 52 have bores 53 through which the rotor shaft 8 extends, said hubs being secured to the shaft by suitable fastening devices such as keys 54 and set screws 55. The inner faces of the end members 51 are provided with grooves 56 for receiving the ends of the ring member 50 and also the inner faces of the end members 51 and the inner ends of the hubs 52 are provided with grooves 57 which cooperate with grooves 58 in the inner surface of the ring member 50 for receiving spaced pairs of blade guides 59, the end members 51, ring member 50 and blade guides 59 all being held in assembled relation by suitable fastening devices 60. The blade guides 59 are preferably spaced parallel plates with the spacing therebetween registering with slots 61 in the ring member 50 which are of suitable width to slidably receive vanes of blades 62 that are of suitable size to have adequate support between the blade guides when the outer edges 63 of said blades engage the rotor housing 26. The blade guides are spaced from the shaft 8 whereby there is communication of the space between the blade guides of each pair with the interior of the rotor.

The bearings 48, rotor assembly 11 and shaft 8 are all arranged whereby the ring member 50 contacts the rotor housing 26 at the side thereof adjacent the portion 29 of the casing as illustrated in Figs. 3 and 4 whereby when the blades are extended as illustrated in Fig. 4 and the valve ports 44 register with the ports 45 and 46, rotation of the rotor will move liquid from one to the other of the fluid chambers 31 and 32. Suitable seal members 64 are arranged between the rotor end members 51 and the casing to reduce leakage of liquid from the rotor housing through the bearings 48. End closures 65 and 66 are provided with bores 67 whereby they are sleeved on the shaft 8 and are suitably secured by fastening devices 68 to the end walls 13 and 14 respectively and have engagement with the bearing members 48 to aid in retaining same in place. Suitable seal members 69 are arranged inside of the closures 65 and 66 adjacent the bore 67 thereof and engage the shaft 8 to aid in retaining liquid in the casing. A second closure 70 is preferably mounted on the outer end of the end closure 65 to enclose an oil slinger ring 71 and a felt seal ring 72 to further provide a fluid seal for the respective end of the brake apparatus. A plug 73 closes an oil drain in the closure 70.

The blades 62 are normally held in depressed or retracted position by blade lock mechanism 74 which is actuated by fluid pressure supplied by a pump mechanism 75 driven from the shaft 8 as later described. The actuators 74 include pistons 76 slidably mounted in cylinders 77 fixed on one of the end members 51 of the rotor 11 on opposite sides of the blade guides 59 with the ends of the cylinder adjacent the respective end member of the rotor communicating through passages 78 extending to the exterior of the rotor adjacent said end member. The ends of the pistons 76 extending from the cylinders 77 for each vane are connected by a pin 79 that extends through elongate slots 80 in the respective pair of blade guides 59 and also through an L-shaped slot 81 in the respective blade. The L-shaped slots 81 are arranged to extend from the inner ends of the blades substantially in alignment with the position of the respective pins 79 when the pistons are retracted and terminate in angularly positioned portions of the slots that align with the slots 80 when the blades are in retracted position as illustrated in Fig. 3. Rollers 82 are mounted on the pins 79 and substantially rotatably engage the sides of the slots 80 and 81.

Fluid pressure for actuating the pistons 77 is supplied from the pump 75 through a duct 83 which communicates through a port 84 with an annular space 85 between the end wall 14 and the adjacent end member 51 whereby the fluid pressure is applied through the passages 78 to the interior of the cylinders 77 tending to force the pistons 76 therefrom to move the rollers 82 into the end portions of the L-shaped slots 81 when the blades are retracted as at the portion of the rotor ring member 50 engaging the rotor housing 26. Disengagement of the rollers 82 from the terminal portions of the slots 81 is effected by fluid pressure being supplied through a duct 86 which communicates with the interior of the casing through a port 87 in the end wall 13 and through an annular groove 88 in said end wall and ports 89 through the adjacent end member 51 to the interior of the rotor to apply fluid pressure to the ends of the pistons extending from the cylinders 77, and also applying fluid pressure through the space between the blade guides 59 and shaft 8 to the inner ends of the blades 62 tending to force same outwardly against the rotor housing 26.

Figure 6:
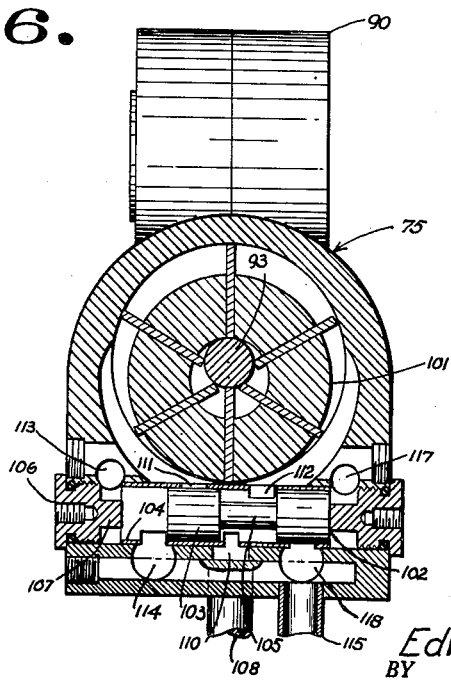
Fig. 6 is a sectional view through the fluid pressure supply pump and flow direction control valve therefor.

In order to apply fluid pressure to the interior of the rotor, and circulate cooling water through the casing, suitable pumps are preferably driven from the shaft 8. In the particular structure, a gear housing 90 is secured to the closure member 66 and encloses a suitable gear 91 fixed on the shaft 8 and drivingly engaging the gear 92 fixed on a shaft 93 and supported in suitable bearings 94. One end 95 of the shaft 93 is drivingly connected to a rotor 96 of a pump 97 for pumping cooling liquid such as water from a tank 98 to the pump and then through a duct 99 to the space or cooling jacket 17 and then through a duct 100 back to the tank 98. The other end of the shaft 93 is drivingly connected to a suitable pump 101 which is illustrated as a vane type pump having a valve assembly 102 arranged whereby regardless of the direction of rotation of the shaft 8, the flow of liquid to and from the pump will be in the same directions. The valve structure includes a floating piston 103 slidably mounted in a sleeve 104 and provided with an intermediate portion 105 of reduced diameter. Arranged at the ends of the sleeves are plugs 106 provided with stop members 107 to limit the travel of the floating piston. A duct 108 leading from a liquid supply tank 109 communicates with a port 110 in the central portion of the sleeve, and spaced ports 111 and 112 arranged diametrically opposite the port 110 whereby when the shaft 93 turns in a counterclockwise direction, Fig. 6, the piston 103 will move to the position shown in Fig. 6 whereby liquid will flow through the port 110 and port 112 into the pump casing at one side of the pump and will be discharged from said pump through a port 113 at the end of the sleeve 104 to maintain pressure on the piston and also will flow through the port 114 to a duct 115 leading to a control valve assembly 116. When the direction of rotation of the shaft 93 is reversed, discharge pressure will be built up on the opposite side of the rotor and flow through a port 117 at the end of the sleeve 104 to force the piston 103 to the opposite end of its stroke whereby liquid will be drawn through the port 110 and port 111 into the pump chamber and be discharged through a port 118 and duct 115 to the control valve assembly 116. The direction of flow of liquid will always be in the same direction through the duct 115.

The valve assembly 116 may be of any suitable type. In the illustrated structure, it is of the sliding piston type wherein the piston 119 is slidably mounted in a housing 120 with a spring 121 normally maintaining the valve in the position shown, Fig. 2, whereby flow of liquid from the pump 95 will enter the valve casing through the duct 115 and pass through the ports and be supplied to the duct 83 for actuating the piston 76 to hold the blades 62 in retracted position. Any leakage from the cylinder 77 will pass through the interior of the rotor and move through the duct 86 to the valve and be delivered through a duct 122 to the tank 109.

Figure 2:
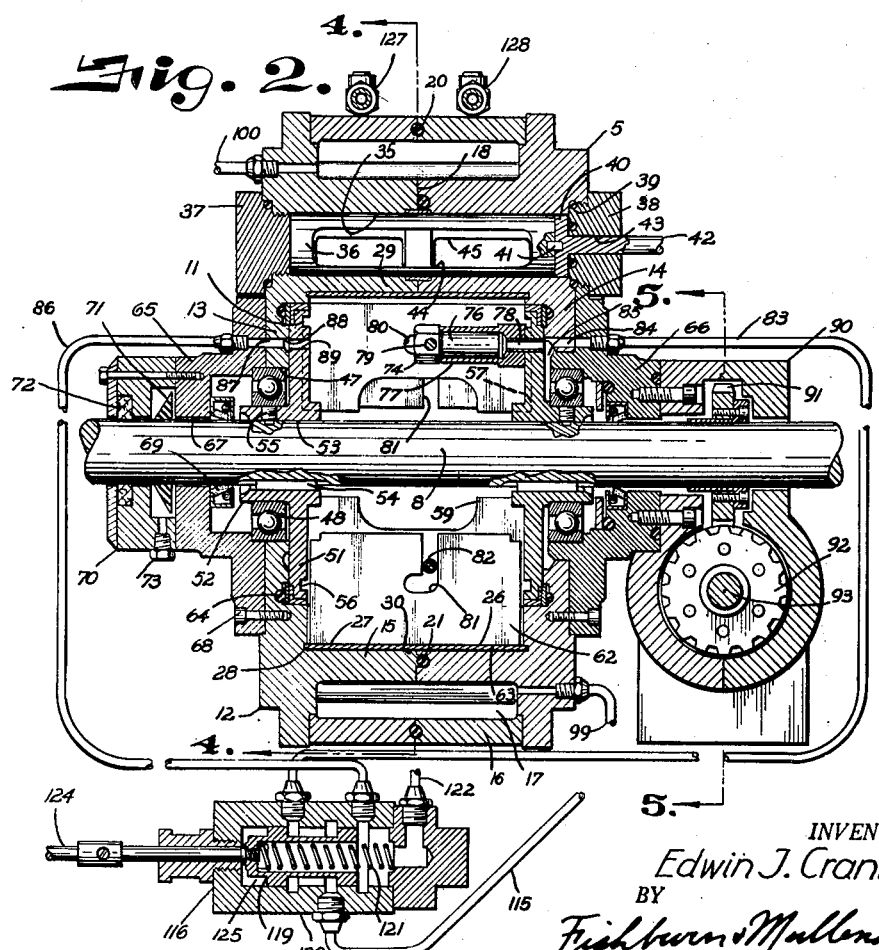
Fig. 2 is a longitudinal sectional view through the brake apparatus.

When it is desired to retard the speed of a vehicle, a suitable control lever 123 is operated and through its connection 124 to the piston 119 will move the piston to the right in Fig. 2 whereby fluid pressure from the duct 115 will flow through the valve and duct 86 into the rotor to apply pressure to the exposed ends of the pistons 76. At the same time, liquid from the duct 83 which communicates with interior of the cylinder 77 will flow into the interior of the valve housing 120 through a port 125 into the interior of the piston and then through the duct 122 to the tank 109. As soon as the valve 116 is operated to release the vanes or blades 62, the rotation of the rotor and blades therein will cause fluid to be moved around the interior of the casing, flowing through the ports 45, passage 44 and ports 46. Then a control 126 suitably connected to the shaft 42 is operated to rotate the valve 36 to the position shown in Fig. 4 stopping the flow therethrough, building up pressure in the fluid chamber 31 or 32 on the discharge side of the rotor housing, depending upon direction of rotation of the shaft 8, thereby applying retarding force to the rotor. In order to avoid excessive pressure being accumulated in either of the fluid chambers and causing wheels to slide or damage to the equipment, by-passes 127 and 128 are arranged in communication with the fluid chambers with pressure relief valves therein to limit the maximum pressure that can be accumulated in either of the fluid chambers.

When the vehicle comes to a stop or the speed thereof has been retarded as desired, the control 126 is actuated to move the valve 36 to reestablish circulation of liquid in the interior of the casing, and then the control 123 is actuated to move the valve 116 whereby fluid pressure from the pump 95 is applied through the valve 116 to the duct 83 and cylinders 77 to apply pressure to the pistons 76 and move the pistons and rollers thereon outwardly from the cylinders whereby when each blade 62 is moved by the rotor adjacent the portion 29 in the casing, and the blades are then in retracted position, the piston moves the roller 82 into the end portion of the slot 81 to lock the respective blade in retracted position. This is continued until all of the blades are in retracted position and locked. When the blades are in retracted position, there is no pump action provided by the rotor, the rotor being free to rotate in the fluid and provide substantially no retarding effect on the rotation of the shaft 8.

It is believed obvious I have provided a fluid brake that may be economically installed in vehicles and efficiently operated to retard the speed thereof when desired, and thereby add materially to the safety in the operation of said vehicle.

What I claim and desire to secure by Letters Patent is:

1. A liquid brake assembly comprising, a housing having a cylindrical rotor chamber therein, a shaft journalled in the housing and extending through the rotor chamber eccentrically thereof, a rotor of cylindrical shape fixed on the shaft in the rotor chamber and contacting the peripheral surface at one location therearound, said rotor having a plurality of radially arranged slots spaced therearound and extending to the periphery thereof, said housing having fluid chambers in spaced apart relation, a passage communicating the fluid chambers exteriorly of the rotor chamber, ports communicating one of the fluid chambers with the rotor chamber at one side and the other fluid chamber with the rotor chamber at the other side of the location of contact of the rotor with the surface of the rotor chamber, blades slidably mounted in each of the slots in the rotor and cooperating therewith whereby when the rotor is rotated and the blades extended liquid is moved from one fluid chamber to the other, means operable to close the passage communicating the fluid chambers whereby rotation of the rotor when the blades are extended increases pressure in one of the fluid chambers and applies a retarding force to the rotor blades, cylinders extending into the rotor adjacent to and spaced from each of the blades, said cylinders being parallel to the shaft, slots in the blades extending from the inner ends thereof and terminating in a portion parallel to and in alignment with the cylinders when the blades are in retracted position, piston means operable in the cylinders and having portions extending into the slots in the blades and adapted to engage the portion of said slots parallel to the cylinders when the blades are in retracted position whereby said piston portions are operative to hold the blades in retracted position, and means including valve means communicating a source of fluid pressure with the cylinder to selectively apply fluid pressure to the pistons for moving same into and out of blade retaining position.

2. A liquid brake assembly comprising, a housing having a cylindrical rotor chamber therein, a shaft journalled in the housing and extending through the rotor chamber eccentrically thereof, a rotor of cylindrical shape fixed on the shaft in the rotor chamber and contacting the peripheral surface at one location therearound, said rotor having a plurality of radially arranged slots spaced therearound and extending to the periphery thereof, said housing having fluid chambers in spaced apart relation therein, a passage communicating the fluid chambers exteriorly of the rotor chamber, ports communicating one of the fluid chambers with the rotor chamber at one side and the other fluid chamber with the rotor chamber at the other side of the location of contact of the rotor with the surface of the rotor chamber, blades slidably mounted in each of the slots in the rotor and cooperating therewith whereby when the rotor is rotated and the blades extended liquid is moved from one fluid chamber to the other, means operable to close the passage communicating the fluid chambers whereby rotation of the rotor when the blades are extended increases pressure in one of the fluid chambers and applies a retarding force to the rotor blades, cylinders extending into the rotor adjacent to and spaced from each of the blades, said cylinders being parallel to the shaft, slots in the blades extending from the inner ends thereof and terminating in a portion parallel to and in alignment with the cylinders when the blades are in retracted position, piston means operable in the cylinders and having portions extending into the slots in the blades and adapted to engage the portion of said slots parallel to the cylinders when the blades are in retracted position whereby said piston portions are operative to hold the blades in retracted position, a source of fluid pressure including pump means having a fluid pressure discharge and operated in response to rotation of the shaft, ducts communicating the discharge of the pump to the opposite ends of the piston means and valve means operable to selectively apply fluid pressure from the pump discharge to the pistons for moving same into and out of blade retaining position.

3. A liquid brake assembly comprising, a casing having a cylindrical chamber therein, a cylindrical rotor housing eccentrically of the cylindrical chamber and engaged with a portion of the peripheral surface at one location therearound, a casing portion in the cylindrical chamber substantially diametrically opposite the contacting location of the rotor housing and periphery of the cylindrical chamber forming a partition cooperating with the rotor housing in defining spaced fluid chambers on opposite sides of the partition, ports in the rotor housing communicating the interior thereof with the respective fluid chambers, a passage extending through the partition providing communication between the fluid chambers exteriorly of the rotor housing, valve means in the passage operable to close same to limit communication between the fluid chambers, a shaft journalled in the casing and extending through the rotor housing eccentrically thereof, a hollow rotor of cylindrical shape fixed on the shaft in the rotor housing and contacting the peripheral surface of the interior thereof substantially adjacent the casing portion forming the partition, said rotor having a plurality of radially arranged slots spaced therearound and extending to the periphery thereof, spaced plate means inside the rotor with the inner surfaces of said plates in alignment with the slots in the rotor, blades slidably mounted in each of the slots in the rotor between the plates, elongated slots in the plates substantially parallel with the shaft and spaced therefrom, L-shaped slots in the blades extending from the inner ends thereof and terminating in portions alignable with the slots in the plates when the blades are in retracted position, latch means extending through the slots in the plates and blades, and means operatively connected with the latch means for moving same into and out of blade retaining position.

4. A liquid brake assembly comprising, a casing having a cylindrical chamber therein, a cylindrical rotor housing eccentrically of the cylindrical chamber and engaged with a portion of the peripheral surface at one location therearound, a casing portion in the cylindrical chamber substantially diametrically opposite the contacting location of the rotor housing and periphery of the cylindrical chamber forming a partition cooperating with the rotor housing in defining spaced fluid chambers on opposite sides of the partition, ports in the rotor housing communicating the interior thereof with the respective fluid chambers, a passage extending through the partition providing communication between the fluid chambers exteriorly of the rotor housing, valve means in the passage operable to close same to limit communication between the fluid chambers, a shaft journalled in the casing and extending through the rotor housing eccentrically thereof, a hollow rotor of cylindrical shape fixed on the shaft in the rotor housing and contacting the peripheral surface of the interior thereof substantially adjacent the casing portion forming the partition, said rotor having a plurality of radially arranged slots spaced therearound and extending to the periphery thereof, spaced plate means inside the rotor with the inner surfaces of said plates in alignment with the slots in the rotor, blades slidably mounted in each of the slots in the rotor between the plates, elongated slots in the plates substantially parallel with the shaft and spaced therefrom, L-shaped slots in the blades extending from the inner ends thereof and terminating in portions alignable with the slots in the plates when the blades are in retracted position, abutment means extending through the slots in the plates and blades, piston means in the rotor adjacent each of the plates and operatively connected with the abutment means, cylinders fixed in the rotor and slidably receiving the piston means, a source of liquid pressure, means including valve means communicating the source of liquid pressure with the cylinders in the rotor and the interior of the rotor and operable to selectively apply liquid pressure to the pistons for moving same and the abutment means thereon into and out of blade-retaining position, and pressure regulated by-pass means providing communication between the fluid chambers to limit the pressure accumulated therein.

5. A liquid brake assembly comprising, a casing having a cylindrical chamber therein, a cylindrical rotor housing eccentrically of the cylindrical chamber and engaged with a portion of the peripheral surface at one location therearound, a casing portion in the cylindrical chamber substantially diametrically opposite the contacting location of the rotor housing and periphery of the cylindrical chamber forming a partition cooperating with the rotor housing in defining spaced fluid chambers on opposite sides of the partition, ports in the rotor housing communicating the interior thereof with the respective fluid chambers, a passage extending through the partition providing communication between the fluid chambers exteriorly of the rotor housing, valve means in the passage operable to close same to limit communication between the fluid chambers, a shaft journalled in the casing and extending through the rotor housing eccentrically thereof, a hollow rotor of cylindrical shape fixed on the shaft in the rotor housing and contacting the peripheral surface of the interior thereof substantially adjacent the casing portion forming the partition, said rotor having a plurality of radially arranged slots spaced therearound and extending to the periphery thereof, spaced plate means inside the rotor with the inner surfaces of said plates in alignment with the slots in the rotor, blades slidably mounted in each of the slots in the rotor between the plates, elongated slots in the plates substantially parallel with the shaft and spaced therefrom, L-shaped slots in the blade extending from the inner ends thereof and terminating in portions alignable with the slots in the plates when the blades are in retracted position, abutment means extending through the slots in the plates and blades, piston means in the rotor adjacent each of the plates and operatively connected with the abutment means, cylinders fixed in the rotor and slidably receiving the piston means, pump means operatively connected with the shaft whereby rotation of the shaft drives said pump means, said pump having an inlet and discharge, a source of liquid supply connected with the inlet of the pump, flow control means communicating with the discharge of the pump, said flow control means having communication with the cylinders in the rotor and the interior of the rotor and operable to selectively apply liquid pressure from the pump to the pistons for moving same and the abutment means thereon into and out of blade-retaining position, and pressure regulated by-pass means providing communication between the fluid chambers to limit the pressure accumulated therein.

References Cited in the file of this patent

UNITED STATES PATENTS

| | | |
|---|---|---|
| 1,008,201 | Schmucker | Nov. 7, 1911 |
| 1,501,444 | English et al. | July 15, 1924 |
| 1,614,119 | Giovannini | Jan. 11, 1927 |
| 2,358,825 | Pribula | Sept. 26, 1944 |
| 2,681,713 | Chambers | June 22, 1954 |